United States Patent
Imura et al.

(10) Patent No.: US 11,035,411 B2
(45) Date of Patent: Jun. 15, 2021

(54) SLIDING PARTS

(71) Applicant: EAGLE INDUSTRY CO., LTD., Tokyo (JP)

(72) Inventors: Tadatsugu Imura, Tokyo (JP); Ayano Tanishima, Tokyo (JP); Hideyuki Inoue, Tokyo (JP); Yuichiro Tokunaga, Tokyo (JP); Yuta Negishi, Tokyo (JP); Yuki Maetani, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/626,838

(22) PCT Filed: Jul. 12, 2018

(86) PCT No.: PCT/JP2018/026251
§ 371 (c)(1),
(2) Date: Dec. 26, 2019

(87) PCT Pub. No.: WO2019/013271
PCT Pub. Date: Jan. 17, 2019

(65) Prior Publication Data
US 2020/0224722 A1 Jul. 16, 2020

(30) Foreign Application Priority Data
Jul. 14, 2017 (JP) .............................. JP2017-137916

(51) Int. Cl.
*F16C 17/04* (2006.01)
*F16C 17/10* (2006.01)
(Continued)

(52) U.S. Cl.
CPC .......... *F16C 33/743* (2013.01); *F16C 17/045* (2013.01); *F16C 17/102* (2013.01);
(Continued)

(58) Field of Classification Search
CPC ...... F16C 17/04; F16C 17/045; F16C 17/102; F16C 33/1065; F16C 33/107;
(Continued)

(56) References Cited

U.S. PATENT DOCUMENTS 4,789,250 A    12/1988 Schluter
9,228,660 B2 *  1/2016 Hosoe .................. F16J 15/3412
(Continued)

FOREIGN PATENT DOCUMENTS

CN        101016949 A    8/2007
CN        103090005 B    4/2014
(Continued)

OTHER PUBLICATIONS

International Search Report (ISR) dated Sep. 25, 2018, issued for International application No. PCT/JP2018/026251. (2 pages).
(Continued)

*Primary Examiner* — Marcus Charles
(74) *Attorney, Agent, or Firm* — Law Office of Katsuhiro Arai

(57) ABSTRACT

A pair of sliding parts has sliding faces S that slide with respect to each other in which at least the sliding face S on one side includes dimple groups 20 formed by arranging plural dimples 10, and the dimples 10 are arranged in such a manner that a radial-direction coordinate average of center coordinates of the dimples 10 of the dimple group 20 is smaller than a sliding radius Rm of the sliding face S. The sliding parts can improve a characteristic of suctioning from the leakage side to sliding faces, thereby providing excellent sealing property.

18 Claims, 9 Drawing Sheets

(51) Int. Cl.
*F16C 33/10* (2006.01)
*F16J 15/34* (2006.01)
*F16C 33/74* (2006.01)

(52) U.S. Cl.
CPC .......... *F16C 33/107* (2013.01); *F16J 15/3412* (2013.01); *F16C 2240/40* (2013.01); *F16C 2240/70* (2013.01)

(58) Field of Classification Search
CPC ............... F16C 33/743; F16C 2240/30; F16C 2240/44; F16C 2240/70; F16J 15/3408; F16J 15/3412; F16J 2240/70
USPC ....... 384/121, 123, 130, 132, 261, 284, 420; 277/399
See application file for complete search history.

(56) References Cited

U.S. PATENT DOCUMENTS

| | | | | |
|---|---|---|---|---|
| 9,494,239 | B2 * | 11/2016 | Hosoe | .................... F16J 15/342 |
| 9,829,043 | B2 * | 11/2017 | Inoue | ...................... F16C 33/74 |
| 9,951,873 | B2 * | 4/2018 | Inoue | ................... F16J 15/3412 |
| 9,970,478 | B2 * | 5/2018 | Inoue | ...................... F16C 17/02 |
| 2003/0178781 | A1 | 9/2003 | Tejima | |
| 2003/0189294 | A1 * | 10/2003 | Tejima | ................. F16J 15/3424 |
| | | | | 277/399 |
| 2011/0215531 | A1 | 9/2011 | Tokunaga et al. | |
| 2011/0233872 | A1 | 9/2011 | Iguchi et al. | |
| 2014/0167362 | A1 | 6/2014 | Hosoe et al. | |
| 2015/0260292 | A1 | 9/2015 | Inoue et al. | |
| 2016/0195139 | A1 | 7/2016 | Inoue et al. | |
| 2017/0234431 | A1 | 8/2017 | Katori et al. | |
| 2018/0017163 | A1 | 1/2018 | Hosoe et al. | |
| 2018/0058502 | A1 | 3/2018 | Hosoe et al. | |
| 2019/0170257 | A1 | 6/2019 | Hosoe et al. | |
| 2019/0264737 | A1 | 8/2019 | Itadani | |
| 2019/0316682 | A1 | 10/2019 | Negishi et al. | |
| 2020/0158162 | A1 | 5/2020 | Imura et al. | |
| 2020/0182356 | A1 | 6/2020 | Itadani et al. | |
| 2021/0054934 | A1 | 2/2021 | Imura et al. | |

FOREIGN PATENT DOCUMENTS

| | | | |
|---|---|---|---|
| CN | 203641506 U | 6/2014 | |
| EP | 1350996 A2 | 10/2003 | |
| EP | 3048341 A1 | 7/2016 | |
| EP | 3627011 A1 | 3/2020 | |
| JP | S631814 A | 1/1988 | |
| JP | 2001221179 A | 8/2001 | |
| JP | 2003343741 A | 12/2003 | |
| JP | 2004003578 A | 1/2004 | |
| JP | 2004162907 A | 6/2004 | |
| JP | 4316956 B2 | 8/2009 | |
| JP | 4557223 B2 * | 10/2010 | ............ F16C 35/073 |
| JP | 2011185292 A * | 9/2011 | ........... F16J 15/3412 |
| JP | 5456772 B2 | 4/2014 | |
| WO | 02093046 A1 | 11/2002 | |
| WO | WO-2013031530 A1 * | 3/2013 | ............. F16J 15/342 |
| WO | 2014112455 A1 | 7/2014 | |
| WO | 2015041048 A1 | 3/2015 | |
| WO | 2016035860 A1 | 3/2016 | |
| WO | WO-2016129553 A1 * | 8/2016 | ............ F16C 17/045 |
| WO | 2016143721 A1 | 9/2016 | |
| WO | WO-2016203878 A1 * | 12/2016 | ............... F16J 15/34 |
| WO | WO-2018043307 A1 * | 3/2018 | ............... F16C 17/04 |
| WO | WO-2018070265 A1 * | 4/2018 | ............. F16J 15/002 |
| WO | WO-2018088353 A1 * | 5/2018 | ........... F16J 15/3416 |
| WO | WO-2018092829 A1 * | 5/2018 | ............ F16C 17/045 |

OTHER PUBLICATIONS

Extended European Search Report (EESR) dated Dec. 23, 2020, issued for related European counterpart patent application No. EP18803055.5 (6 pages).

International Search Report (ISR) dated Jun. 26, 2018, issued for related International application No. PCT/JP2018/018624. (2 pages).

Non-Final Office Action issued by U.S. Patent and Trademark Office, dated Jan. 27, 2021, for a co-pending U.S. Appl. No. 16/610,844. (12 pages).

Extended European Search Report (EESR) dated Dec. 21, 2020, issued for related European patent application No. EP18802992.0 (6 pages).

Extended European Search Report (EESR) dated Feb. 17, 2021, issued for European counterpart patent application No. EP18832266.3 (7 pages).

International Search Report (ISR) dated Jul. 10, 2018, issued for related International application No. PCT/JP2018/018623. (1 page).

* cited by examiner

SLIDING RADIUS $Rm = \dfrac{Ro + Ri}{2}$

SLIDING RADIUS $Rm = \dfrac{Ro+Ri}{2}$

SLIDING PARTS

CROSS-REFERENCE TO RELATED APPLICATIONS

This application is the U.S. National Phase under 35 U.S.C. § 371 of International Application PCT/JP2018/026251, filed Jul. 12, 2018, which claims priority to Japanese Patent Application No. JP2017-137916, filed Jul. 14, 2017. The International Application was published under PCT Article 21(2) in a language other than English.

TECHNICAL FIELD

The present invention relates to a sliding part suitable, for example, as a mechanical seal, a sliding bearing, and other sliding units. In particular, the present invention relates to a sliding part such as a seal ring or a bearing that requires reduction of friction by interposing a fluid between sliding faces, and prevention of leakage of the fluid from the sliding faces.

BACKGROUND ART

In a mechanical seal serving as an example of a sliding part, while maintaining a sealing property, sliding friction during rotation is required to be reduced to the extreme. By variously texturing the sliding faces, a method of reducing friction is realized. For example, as one of texturing, arrangement of dimples on the sliding faces is known.

Conventionally, in a case where dimples are provided on a sliding face in order to meet contradictory conditions of sealing and lubricating, plural dimples are arranged and aligned in order in general. For example, in the invention described in JP 2003-343741 A (hereinafter, referred to as "Patent Document 1"), for the purpose of reducing a friction coefficient of a sliding face and improving a sealing ability, plural thin and long dimples are provided and aligned in order in a regular manner on the sliding face so that the inclination directions of the dimples are different between the outer peripheral side and the inner peripheral side with a border reference line X as a borderline. Leading ends in the rotation direction of the dimples on the outer peripheral side are inclined toward the outer peripheral side, and leading ends in the rotation direction of the dimples on the inner peripheral side are inclined toward the inner peripheral side.

Conventionally, in order to improve a lubricating property, random arrangement of plural dimples is also known. For example, in the invention described in JP 2001-221179 A (hereinafter, referred to as "Patent Document 2"), plural dimples are randomly arranged on an inner wall of a cylinder of a rotary compressor and a leading end surface and both side end surfaces of a sliding vane.

CITATION LIST

Patent Documents

Patent Document 1: JP 2003-343741 A
Patent Document 2: JP 2001-221179 A

SUMMARY OF THE INVENTION

Technical Problem

However, in the invention described in Patent Document 1, an effect of suctioning from the leakage side to the sliding face and an effect of flowing from the sealed fluid side to the sliding face are low. Thus, there is a need for a complicated configuration in which the leading ends in the rotation direction of the dimples on the outer peripheral side are inclined toward the outer peripheral side and the leading ends in the rotation direction of the dimples on the inner peripheral side are inclined toward the inner peripheral side. Since a fluid concentrates on a radially center portion of the sliding face, there is also a problem that the entire sliding face cannot be uniformly lubricated.

The invention described in Patent Document 2 is just to randomly arrange the plural dimples in order to improve the lubricating property, and there is no examination on improvement in the sealing property.

By arranging the plural dimples, a lubricating performance is improved. However, an effect of suctioning a fluid to leak out to the low pressure fluid side, the so-called pumping effect is less easily obtained. Thus, there is a problem that leakage occurs. There is also a problem that it is unclear which arrangement influences the lubricating performance in what way.

A first object of the present invention is to provide sliding parts excellent in a sealing property by finding out a relationship between a dimple arrangement characteristic and a pumping characteristic in a case where plural dimples are arranged, and improving a characteristic of suctioning a fluid from the leakage side to sliding faces.

In addition to the first object, a second object of the present invention is to provide sliding parts with which contradictory conditions of sealing and lubricating can be met by improving a characteristic of letting the fluid flow from the sealed fluid side to the sliding faces.

Solution to Problem

[Principle of the Prevent Invention]
The inventors of the present invention conducted numerical experiments of arrangement conditions by using experiment plans based on the Latin hypercube method in sliding parts in which plural dimples are arranged on sliding faces. As a result, the inventors obtained a finding that there is the following relationships between dimple arrangement and a pumping characteristic and a lubricating characteristic.
(1) A suction amount from the leakage side to the sliding faces (hereinafter, sometimes referred to as the pumping amount) correlates to an average of radiuses of the dimples measured at the center coordinates of the dimples with respect to the sliding axis in the radial direction of the sliding faces. That is, when a relative position of the average radius of the dimples (R mean) in the sliding face having the dimples in the radial direction is smaller than 0.5, an amount of a fluid suctioned from the inner peripheral side of the sliding faces (leakage side) into the sliding faces is increased. The relative position of the average radius of the dimples (R mean) is expressed by the following expression.

$R$ mean=("the average of the radiuses of the dimples measured at the center coordinates of the dimples"−"inner radius $R_i$ of the sliding faces")/("outer radius $R_o$ of the sliding faces"−"inner radius $R_i$ of the sliding faces")

(2) Torque of the sliding faces that slide with respect to each other correlates to a standard deviation of angular-direction coordinates of dimples normalized by uniform distribution (hereinafter, referred to as the "angular-direction standard deviation $\sigma_\theta$" indicating a dispersion degree of a dimple group in the angular direction). When the angular-direction standard deviation $\sigma_\theta$ is smaller than one, more preferably, smaller than 0.8, large torque is less easily generated.

Based on the finding described above, the invention of the present application is to firstly improve a sealing property by arranging dimples in such a manner that the average of the radiuses of the dimple measured at center coordinates of the dimples with respect to a sliding axis is smaller than the sliding radius and improving a characteristic of suctioning from the leakage side to sliding faces, and secondly prevent generation of large torque by arranging the dimples in such a manner that an angular-direction standard deviation GO of the dimples is smaller than one, more preferably, smaller than 0.8 and improving a lubricating property.

Solution

In order to attain the above objects, sliding parts according to a first aspect of the present invention are a pair of sliding parts having sliding faces that slide with respect to each other around a sliding axis of the sliding faces in which at least the sliding face on one side includes a dimple group formed by arranging plural dimples, characterized in that the dimples are arranged in such a manner that an average of radiuses of the dimples measured at center coordinates of the dimples of the dimple group with respect to the sliding axis is smaller than a sliding radius of the sliding face which is an average of an inner radius of the sliding face and an outer radius of the sliding face.

According to the first aspect, it is possible to improve a characteristic of suctioning a fluid from the leakage side to the sliding face. Thus, it is possible to provide the sliding parts excellent in a sealing property.

According to a second aspect of the present invention, the sliding parts of the present invention are characterized in that plural dimple groups are formed independently from each other in the circumferential direction of the sliding face via a land portion. According to the second aspect, the fluid flowing through the dimple group is blocked by the land portion, and dynamic pressure is generated, so that it is possible to improve a lubricating performance.

According to a third aspect of the present invention, the sliding parts of the present invention are characterized in that the dimples are arranged in such a manner that an angular-direction standard deviation of the center coordinates of the dimples of the dimple group is less than one.

According to the third aspect, it is possible to improve a characteristic of letting the fluid flow from the sealed fluid side to the sliding face and obtain a thick liquid film. Thus, it is possible to provide the sliding parts excellent in a lubricating property.

According to a fourth aspect of the present invention, the sliding parts of the present invention are characterized in that the dimples are arranged in such a manner that an angular-direction standard deviation of the center coordinates of the dimples of the dimple group is less than 0.8.

According to the fourth aspect, it is possible to furthermore improve the characteristic of letting the fluid flow from the sealed fluid side to the sliding face and obtain a thick liquid film. Thus, it is possible to provide the sliding parts excellent in the lubricating property.

According to a fifth aspect of the present invention, the sliding parts of the present invention are characterized in that a pumping dimple group formed by arranging the dimples in such a manner that the average of the radiuses of the dimples measured at the center coordinates of the dimples of the dimple group with respect to the sliding axis is smaller than the sliding radius of the sliding face is arranged on the leakage side of the sliding face, and a lubricating dimple group formed by arranging the dimples in such a manner that the angular-direction standard deviation of the center coordinates of the dimples of the dimple group is at least less than one is arranged on the sealed fluid side of the sliding face.

According to the fifth aspect, it is possible to improve the sealing property of the sliding face and also furthermore improve the lubricating property.

According to a sixth aspect of the present invention, the sliding parts of the present invention are characterized in that the sliding face further includes an annular groove arranged between the pumping dimple group and the lubricating dimple group, and a communication groove providing communication between the annular groove and the sealed fluid side.

According to the sixth aspect, since the fluid can be supplied from the sealed fluid side to the sliding face via the communication groove and the annular groove, it is possible to improve the lubricating property of the sliding face. It is also possible to prevent contact between the pumping dimple group and the lubricating dimple group by the annular groove. Thus, it is possible to sufficiently exert functions of the pumping dimple group and functions of the lubricating dimple group.

According to an eighth aspect of the present invention, the sliding parts of the present invention are characterized in that the aligned dimple group is formed by arranging plural sub dimple groups in a concentric manner, the sub dimple groups being respectively formed by arranging the plural dimples in forms of rings.

According to the eighth aspect, it is possible to easily form the dimple group having arrangement with an increased sealing performance.

According to a ninth aspect of the present invention, the sliding parts of the present invention are characterized in that the sub dimple groups are arranged in such a manner that a radial gap between the sub dimple groups arranged in a concentric manner is gradually increased toward the radially outside.

According to the ninth aspect, it is possible to easily form the dimple group in which the average of the radiuses of the plural dimples is smaller than the sliding radius of the sliding face and provide the dimple group with an increased sealing performance.

According to a tenth aspect of the present invention, the sliding parts of the present invention are characterized in that the plural dimples forming the aligned dimple group are arranged along the axis inclined with respect to the radial axis.

According to the tenth aspect, with the aligned dimple group, it is possible to efficiently take the fluid on the leakage side into the sliding face from the leakage side and improve the sealing property.

According to an eleventh aspect of the present invention, the sliding parts of the present invention are characterized in that on the sliding face, a part where the dimples are arranged densely in the circumferential direction and a part where the dimples are arranged sparsely in the circumferential direction are arranged alternately.

According to the eleventh aspect, it is possible to easily form the aligned dimple group with an increased lubricating performance.

DESCRIPTION OF EMBODIMENTS

Hereinafter, with reference to the drawings, modes for carrying out this invention will be described as examples based on embodiments. However, the dimensions, the materials, the shapes, the relative arrangements, etc. of constituent components described in the embodiments are not intended to limit the scope of the present invention only to them unless otherwise described explicitly.

First Embodiment

With reference to FIGS. 1 to 4, sliding parts according to a first embodiment of the present invention will be described.

In the following embodiment, as an example, a mechanical seal that is an example of the sliding parts will be described. However, the present invention is not limited to this but for example can also be utilized as a sliding part of a bearing that slides with a rotating shaft while sealing lubricating oil on the axially one side of a cylindrical sliding face.

The outer peripheral side of the sliding part forming the mechanical seal will be described as the high pressure fluid side (sealed fluid side), and the inner peripheral side as the low pressure fluid side (leakage side). However, the present invention is not limited to this but a case where the high pressure fluid side and the low pressure fluid side are reversed is also applicable.

Figure 1:
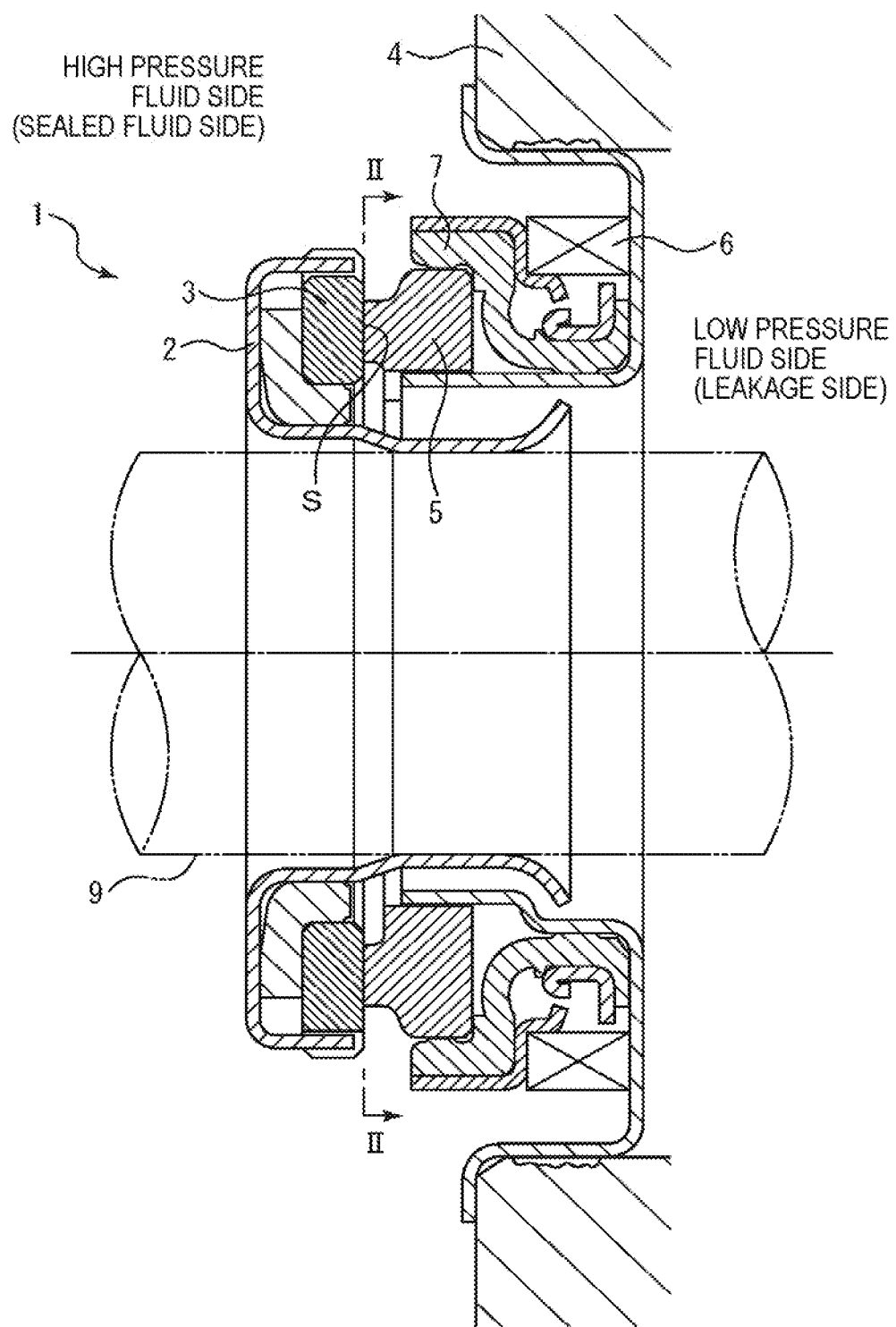
FIG. 1 is a vertically sectional view showing an example of a mechanical seal according to a first embodiment of the present invention.

FIG. 1 is a vertically sectional view showing an example of a mechanical seal 1, which is an inside mechanical seal in the form of sealing a sealed fluid on the high pressure fluid side to leak from the outer periphery of sliding faces toward the inner periphery. The mechanical seal is provided with a ring-shaped rotating side seal ring 3 serving as one sliding part provided across a sleeve 2 on the side of a rotating shaft 9 in a state where the rotating side seal ring is rotatable integrally with this rotating shaft 9, and a ring-shaped stationary side seal ring 5 serving as the other sliding part provided in a housing 4 in a non-rotating state and an axially movable state. With a coiled wave spring 6 and a bellows 7 axially biasing the stationary side seal ring 5, the seal rings slide in close contact with each other at sliding faces S. That is, this mechanical seal 1 prevents an outflow of the sealed fluid from the outer peripheral side of the rotating shaft 9 to the inner peripheral side at the sliding faces S of the rotating side seal ring 3 and the stationary side seal ring 5.

FIG. 1 shows a case where width of the sliding face of the rotating side seal ring 3 is greater than width of the sliding face of the stationary side seal ring 5. However, the present invention is not limited to this but is also applicable to the opposite case as a matter of course.

The material of the rotating side seal ring 3 and the stationary side seal ring 5 is selected from silicon carbide (SiC) excellent in wear resistance, carbon excellent in self-lubricity, etc. For example, both the seal rings can be made of SiC or the rotating side seal ring 3 of SiC and the stationary side seal ring 5 of carbon can be combined.

Dimples are arranged on at least any one of the sliding faces of the rotating side seal ring 3 and the stationary side seal ring 5 that slide with respect to each other.

In the present invention, the "dimples" are dents having opening portions surrounded by the flat sliding face S (land portion) and having bottom portions recessed more than the sliding face S, and the shape of the dimples is not particularly limited. For example, the shape of the opening portions of the dents includes a circle, a triangle, an ellipse, an oval, or a rectangle. The sectional shape of the dents also includes various shapes such as a cone, a truncated cone, a semi-circle, a bowl shape, or a square. The dimples are arranged so as not to overlie each other.

In order to reduce a friction coefficient of the sliding face, it is desirable to activate in a fluid lubricating state. Due to the dent shape of the dimples, a fluid lubricating operation is obtained. A mechanism of fluid lubrication in the dimples is as follows.

When the opposing sliding face is relatively moved, by the wedge operation of hole portions of the dimples, negative pressure is generated in a part on the upstream side of the hole portions, and positive pressure is generated in a part on the downstream side. At that time, in the negative pressure part on the upstream side of the dimples 10, cavitation is generated, and the pressure relies on steam pressure of the fluid in the cavitation region, so that a peak of negative pressure P1 is decreased. As a result, an influence of positive pressure P2 becomes dominant in the dimples 10, a load capacity is generated, and hence the sliding face S is brought up. When the sliding face S is brought up, a gap between the two sliding faces that slide with respect to each other is increased, and the fluid flows into the sliding faces S, so that a lubricating function is obtained.

In the present embodiment, a case where a dimple group 20 formed by arranging and aligning plural dimples in order on the sliding face S of the stationary side seal ring 5 will be described. In this case, dimples may be provided or not provided in the rotating side seal ring 3.

Figure 2:
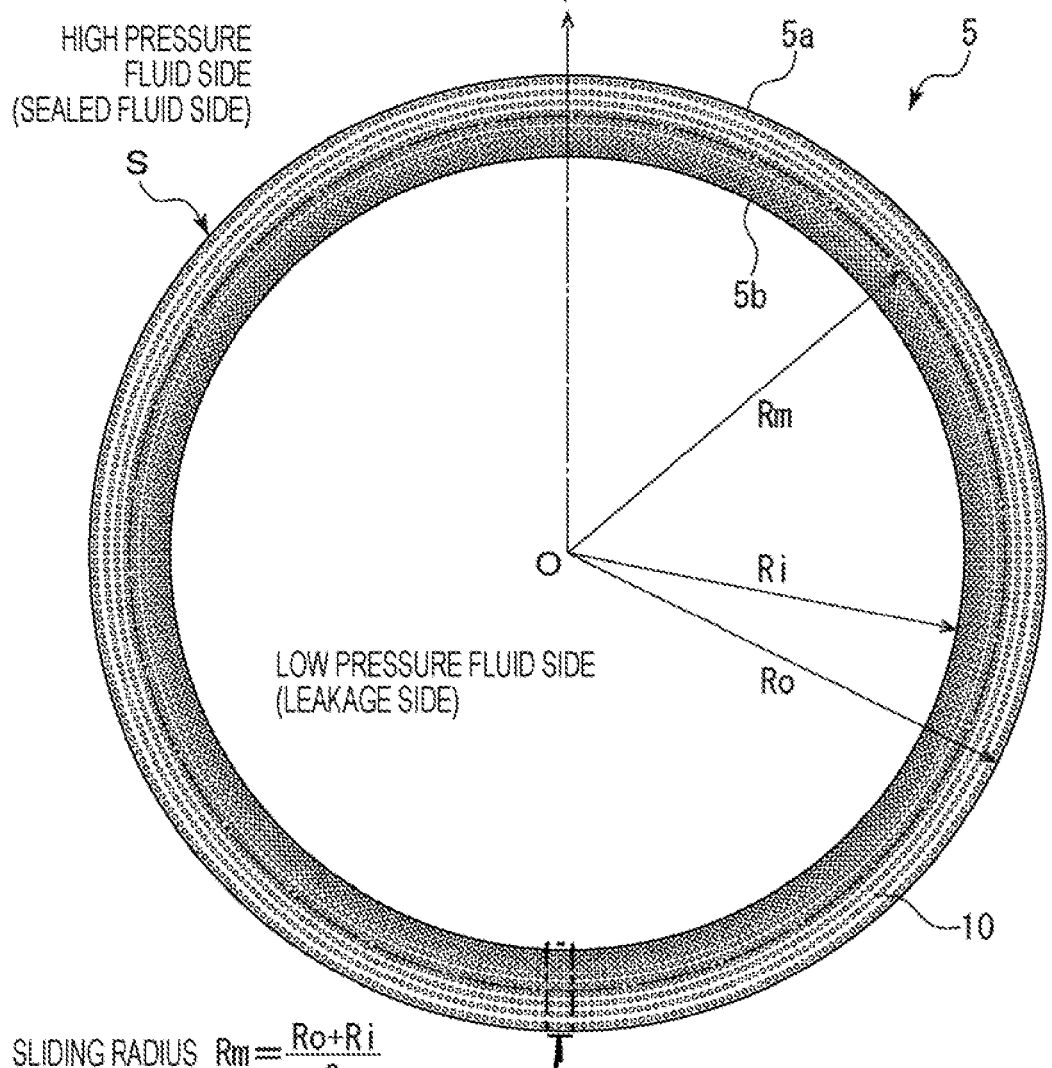
FIG. 2 is a II-II arrow view of FIG. 1, which is a plan view showing an example of arrangement of dimples on a sliding face of a sliding part according to the first embodiment of the present invention.
Figure 2:
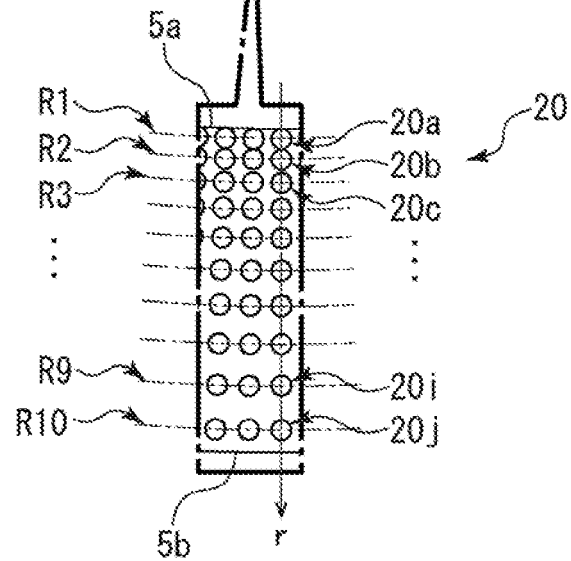

In FIG. 2, the dimple group 20 is formed by arranging and aligning the plural dimples 10 in order from a leakage side peripheral surface 5b of the stationary side seal ring 5 to a sealed fluid side peripheral surface 5a over the entire circumference. The dimple group 20 is formed by arranging sub dimple groups 20a, 20b, 20c, . . . , 20i, 20j in a concentric manner, the sub dimple groups being respectively formed by arranging the plural dimples 10 in forms of rings having radiuses R1, R2, R3, . . . , R9, R10. In each of the sub dimple groups 20a, 20b, 20c, . . . , 20i, 20j, the dimples 10 are arranged at equal angle pitches (in the example of FIG. 2, 360 dimples are arranged for 1°), the magnitude of the radiuses R1, R2, R3, . . . , R9, R10 of the sub dimple groups 20a, 20b, 20c, . . . , 20i, 20j is gradually increased toward the radially outside. In such a way, by arranging in such a manner that a radial gap between the sub dimple groups 20a, 20b, 20c, . . . , 20i, 20j arranged in a concentric manner is gradually increased toward the radially outside, it is possible to arrange in such a manner that an average of radial-direction coordinates of the dimple group 20 is smaller than a sliding radius Rm=(Ri+Ro)/2. Thereby, in the dimple group 20, a suction amount of the fluid from the inner peripheral side of the sliding face S (leakage side) into the sliding face is increased, and a sealing property of the dimple group 20 is improved. The reference sign Ri denotes an inside radius of the sliding face and Ro denotes an outside radius of the sliding face.

The magnitude of the radiuses R1, R2, R3, . . . , R9, R10 of the ring-shaped sub dimple groups 20a, 20b, 20c, . . . , 20i, 20j is linearly increased at a constant rate toward the radially outside. However, the present invention is not limited to this. For example, the sub dimple groups may be arranged in such a manner that the magnitude of the radiuses R1, R2, R3, . . . , R9, R10 of the sub dimple groups 20a, 20b, 20c, . . . , 20i, 20j is gradually but non-linearly increased, so that the sealing property is improved.

With using a relative position of the average radius of the dimples (R mean) in the sliding face having the dimples in the radial direction, which is normalized as in (Expression 1), by arranging the plural dimples 10 on the sliding face S in such a manner that the relative position of the average radius of the dimples (R mean) is smaller than 0.5, it is possible to improve the sealing property of the dimple group 20.

$R$ mean=("the average of the radiuses of the dimples measured at the center coordinates of the dimples"−"inner radius $Ri$ of the sliding face")/ ("outer radius $Ro$ of the sliding face"−"inner radius $Ri$ of the sliding face") (Expression 1)

The dimple group in which the relative position of the average radius of the dimples (R mean) of the plural dimples 10 arranged on the sliding face S is smaller than 0.5 and the suction amount of the fluid from the leakage side into the sliding face is increased will be called as the "pumping dimple group".

Meanwhile, with using an angular-direction standard deviation $\sigma_\theta$ normalized as in (Expression 2), by arranging the plural dimples 10 on the sliding face S in such a manner that the angular-direction standard deviation $6e$ of the center coordinates of the plural dimples 10 is less than one, it is possible to improve a lubricating property of the sliding face S.

angular-direction standard deviation $\sigma_\theta$="angular-direction standard deviation $\sigma$ of dimple group"/"angular-direction standard deviation $\sigma_r$ of aligned dimple group of uniform arrangement" (Expression 2)

When the plural dimples 10 are arranged in such a manner that the angular-direction standard deviation $\sigma_\theta$ is less than one, the amount of the fluid flowing from the sealed fluid side to the sliding face S is increased, the lubricating property is improved, and generation of large torque (resistance of sliding) is prevented. When the dimples are arranged in such a manner that the angular-direction standard deviation $\sigma_\theta$ is less than 0.8, the lubricating property of the sliding face S is furthermore improved, and sliding torque is lowered. In the present invention, the dimple group in which the dimples are arranged in such a manner that the angular-direction standard deviation $\sigma_\theta$ is less than one will be called as the "lubricating dimple group".

The angular-direction standard deviation $\sigma_\theta$ of the dimple group can be determined as follows.

Figure 5:
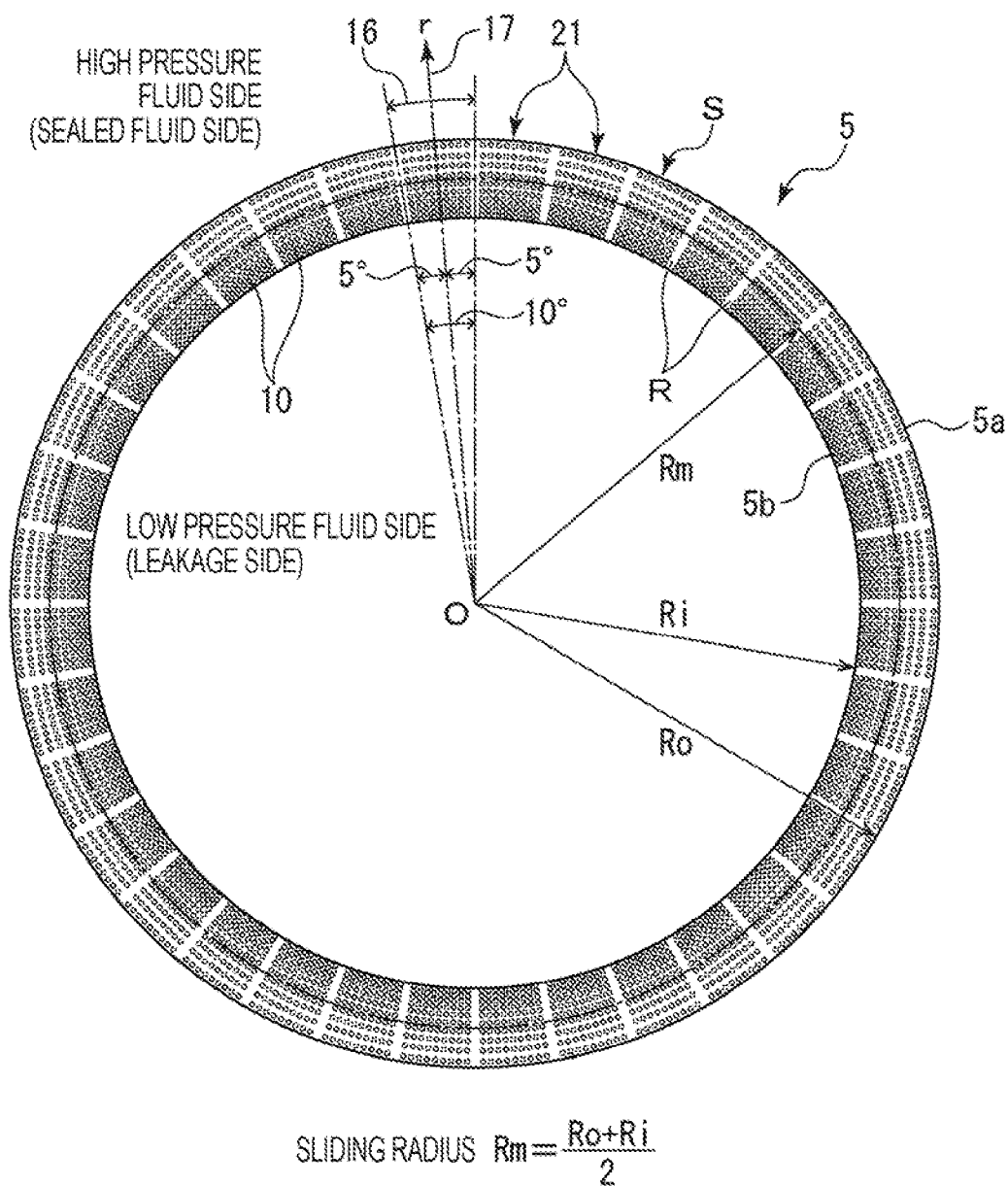
FIG. 5 is a variation of the II-II arrow view of FIG. 1, which is a plan view showing an example of arrangement of dimples on a sliding face of a sliding part according to a second embodiment of the present invention.

(1) For example, in FIG. 5, the thirty-six dimple groups 21 are arranged at equal intervals in the circumferential direction of the sliding face S. Thus, first, the angular-direction standard deviation $\sigma_r$ of the center coordinates of the dimples of the aligned dimple group of the uniform arrangement in a case of thirty-six dimple groups at equal intervals is determined. An angle of a section 16 of the aligned dimple group of the uniform arrangement in a case of thirty-six dimple groups at equal intervals is 10°, and an equal position of the section 16 from a center position 17 is a position of 2.5°. Therefore, the angular-direction standard deviation $\sigma_r$ of the aligned dimple group of the uniform arrangement in a case of thirty-six dimple groups at equal intervals is 2.5°.

(2) From the center position 17 of the section 16, the angular-direction standard deviation 6 of the center coordinates of the dimples 10 forming the dimple group 21 is calculated.

(3) Based on Expression 2 described above, the angular-direction standard deviation 6 of the dimple group 21 is normalized by the angular-direction standard deviation $\sigma_r$ of the aligned dimple group of the uniform arrangement, so that the angular-direction standard deviation e is determined.

Figure 3:
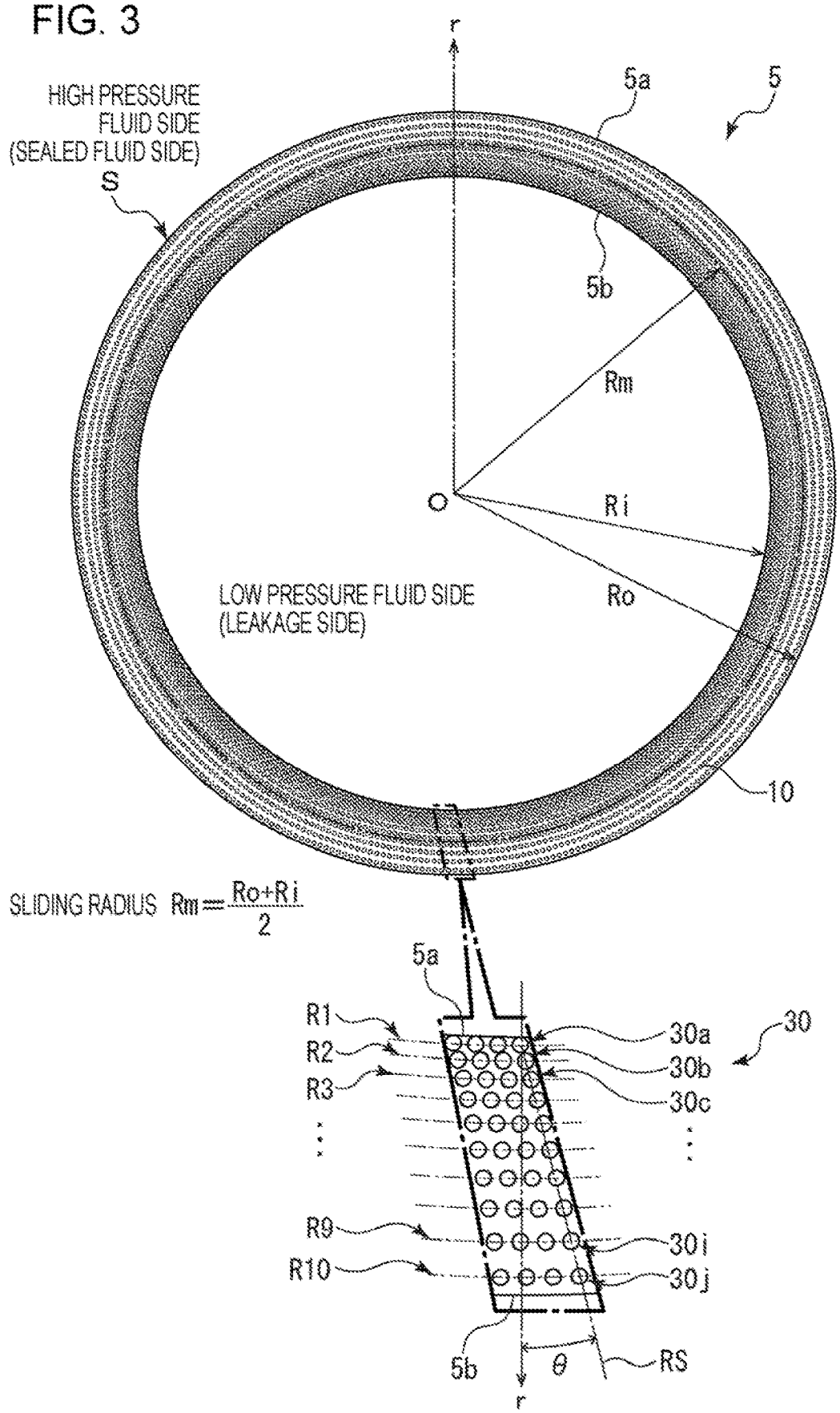
FIG. 3 is a variation of the II-II arrow view of FIG. 1, which is a plan view showing a modified example of the arrangement of the dimples on the sliding face of the sliding part according to the first embodiment of the present invention.

Although the dimples 10 forming the dimple group 20 of FIG. 2 are arranged along the radial axis r, the present invention is limited to this. For example, as shown in FIG. 3, in a dimple group 30 formed by arranging ring-shaped sub dimple groups 30a, 30b, 30c, . . . , 30i, 30j in a concentric manner, the plural dimples 10 may be arranged along the axis RS inclined with respect to the radial axis r by an angle θ to the receding side (downstream side) of the rotation direction of the rotating side seal ring 3 (in FIG. 3, the rotation direction of the rotating side seal ring 3 is the clockwise direction). Thereby, in the dimple group 30, it is possible to suction the fluid from the leakage side into the sliding face with a low pressure loss, and it is possible to further improve a sealing performance.

Figure 4:
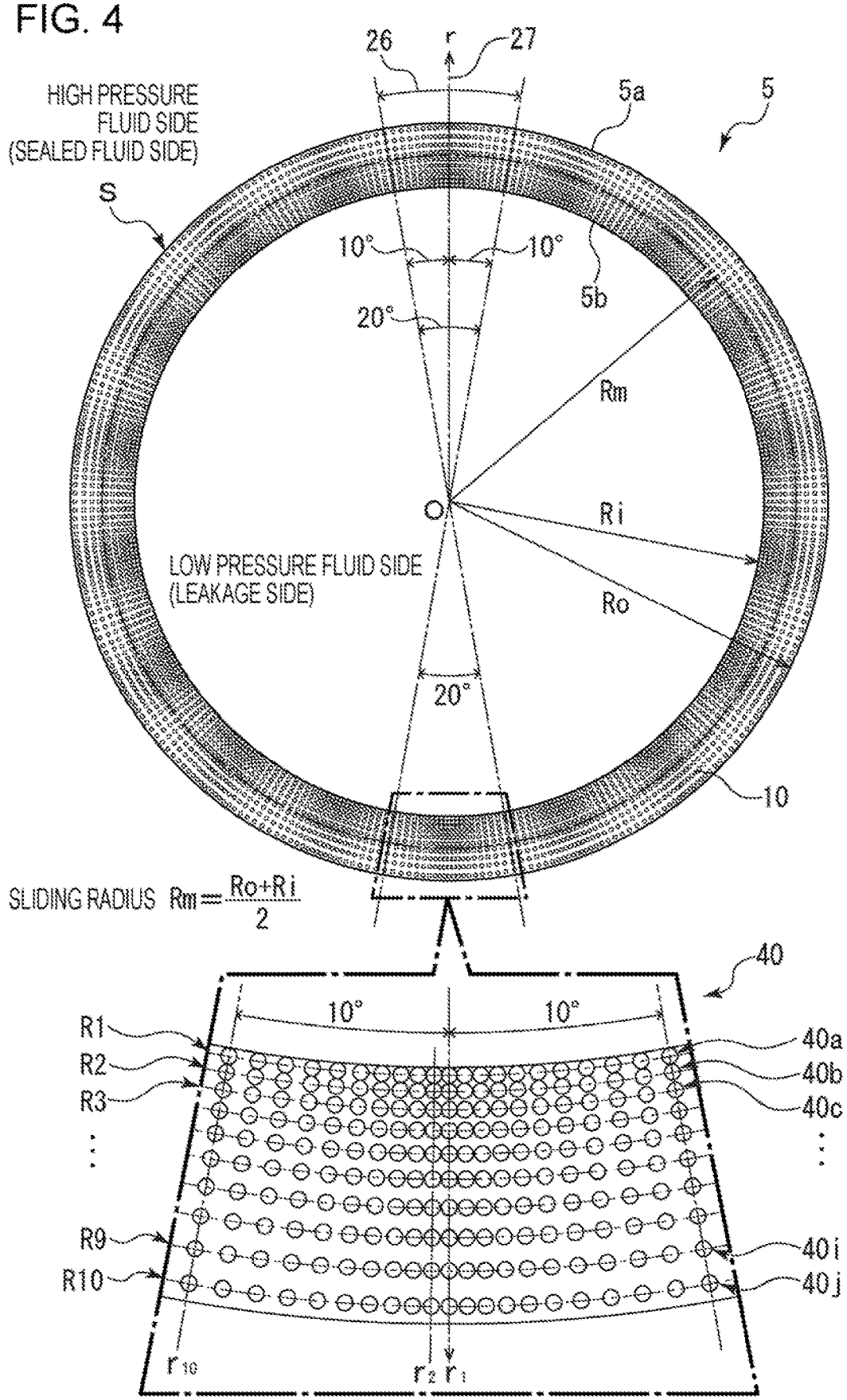
FIG. 4 is a variation of the II-II arrow view of FIG. 1, which is a plan view showing another modified example of the arrangement of the dimples on the sliding face of the sliding part according to the first embodiment of the present invention.

Although the plural dimples 10 forming the dimple group 20 and the dimple group 30 are arranged at equal pitches in the circumferential direction, the present invention is not limited to this. For example, as shown in FIG. 4, the sliding face S is divided into plural sections 26 having a predetermined angle (20° in the example of FIG. 4), a dimple group 40 is arranged in each of the plural sections. The dimple group 40 is formed by arranging sub dimple groups 40a, 40b, 40c, . . . , 40i, 40j in a concentric manner, the sub dimple groups being respectively formed by arranging the plural dimples in forms of rings. The sub dimple groups are arranged in such a manner that a radial gap between the sub dimple groups 40a, 40b, 40c, . . . , 40i, 40j is narrow on the radially inside and is gradually increased toward the radially outside. Thereby, an average of radial-direction coordinates of the dimple group 40 is smaller than a sliding radius Rm=(Ri+Ro)/2, and a suction amount of the fluid from the inner peripheral side of the sliding face S (leakage side) into the sliding face is increased, so that a sealing property of the dimple group 40 is improved.

The dimple groups 40 are arranged symmetrically in the left and right direction with respect to a center axis 27 of each of the sections 26. The dimples 10 are arranged in such a manner that the dimples are densely arranged in a center portion of the section 26 and gradually sparsely arranged from the center portion of the section 26 toward a circumferential end portion. A part where the dimples 10 are arranged densely in the circumferential direction and a part where the dimples are arranged sparsely in the circumferential direction are formed in each of the plural sections 26. That is, the dimples 10 forming the sub dimple groups 40a, 40b, 40c, . . . , 40i, 40j are arranged in a radial manner along radial axes $r_1, r_2, \ldots, r_{10}$, and arranged in such a manner that a circumferential gap between the radial axes $r_1, r_2, \ldots, r_{10}$ is narrow in the center portion of the section 26 and is gradually increased from the center portion of the section 26 toward the circumferential end portion. Thereby, the part where the dimples 10 are arranged densely in the circumferential direction and the part where the dimples are arranged sparsely in the circumferential direction are formed continuously to each other over the entire sliding face S. The angular-direction standard deviation $\sigma_\theta$ of the dimple group 40 is smaller than one, and the amount of the fluid flowing from the sealed fluid side into the dimple group 40 is increased, so that it is possible to improve a fluid lubricating performance. Thus, it is possible to prevent generation of large torque (resistance of sliding).

According to the above description, the sliding parts according to the first embodiment of the present invention exert the following specifically remarkable effects.

The pair of sliding parts in which the plural dimples are arranged on at least the sliding face on one side of the annular sliding faces that slide with respect to each other includes the dimple group 20 in which the dimples 10 are arranged in such a manner that the average of the radiuses of the dimples measured at the center coordinates of the plural dimples 10 is smaller than the sliding radius Rm. Thereby, it is possible to improve a characteristic of suctioning the fluid from the leakage side to the sliding face. Thus, it is possible to provide the sliding parts excellent in the sealing property.

The dimples 10 forming the dimple group 30 are inclined with respect to the radial axis r by the angle θ to the receding side of the rotation direction of the opposing sliding face. Thereby, in the dimple group 30, it is possible to efficiently suction the fluid from the leakage side into the sliding face, and it is possible to further improve the sealing performance.

The dimple group 40 is arranged in such a manner that the average of the radial-direction coordinates of the dimples 10 is smaller than the sliding radius Rm=(Ri+Ro)/2. Thus, it is possible to improve the sealing performance. Further, the part where the dimples 10 are arranged densely in the circumferential direction and the part where the dimples are arranged sparsely in the circumferential direction are arranged alternately on the sliding face S. Thereby, the angular-direction standard deviation σe of the dimple group 40 is smaller than one, and the amount of the fluid flowing from the sealed fluid side into the dimple group 40 is increased, so that it is possible to improve the fluid lubricating performance. Thus, it is possible to prevent generation of large torque (resistance of sliding).

That is, by arranging one type of dimple groups 40 on the sliding face S, it is possible to improve both the sealing performance and the lubricating performance.

Second Embodiment

Next, sliding parts according to a second embodiment of the present invention will be described with reference to FIGS. 5 to 7. The sliding parts according to the second embodiment are different from the first embodiment in a point that dimple groups 21, 31, 41 are separated by land portions R and plural dimple groups are formed separately and independently from each other in the circumferential direction of a sliding face S. However, the other basic configurations are the same as the first embodiment. The same members will be given the same reference signs and duplicated description will be omitted.

The dimple groups 21 shown in FIG. 5 have the same arrangement as the dimple arrangement of the dimple groups 20 of FIG. 2 but are different from the dimple groups 20 of FIG. 2 in a point that the dimple groups 21 are separated from each other by a predetermined angle (10° in the example of FIG. 5) by land portions R.

Dimples 10 forming the dimple group 21 are arranged in such a manner that an average of radial-direction coordinates of center coordinates of the dimples is smaller than a sliding radius Rm, that is, in such a manner that a relative position of the average radius of the dimples (R mean) in the sliding face in the radial direction is not more than 0.5. Thus, an amount of a fluid suctioned from the inner peripheral side of the sliding face S (leakage side) into the sliding face is increased, and a sealing performance of a mechanical seal 1 is improved.

The dimple groups 21 are separated in the circumferential direction by the land portions R. Thus, circumferential movement of the fluid flowing into the sliding face S is blocked by the land portions, and positive pressure is generated. By this positive pressure, a gap between two sliding faces that slide with respect to each other is increased, and the fluid having the lubricating property flows into the sliding face S, so that the fluid lubricating operation is improved.

Figure 6:
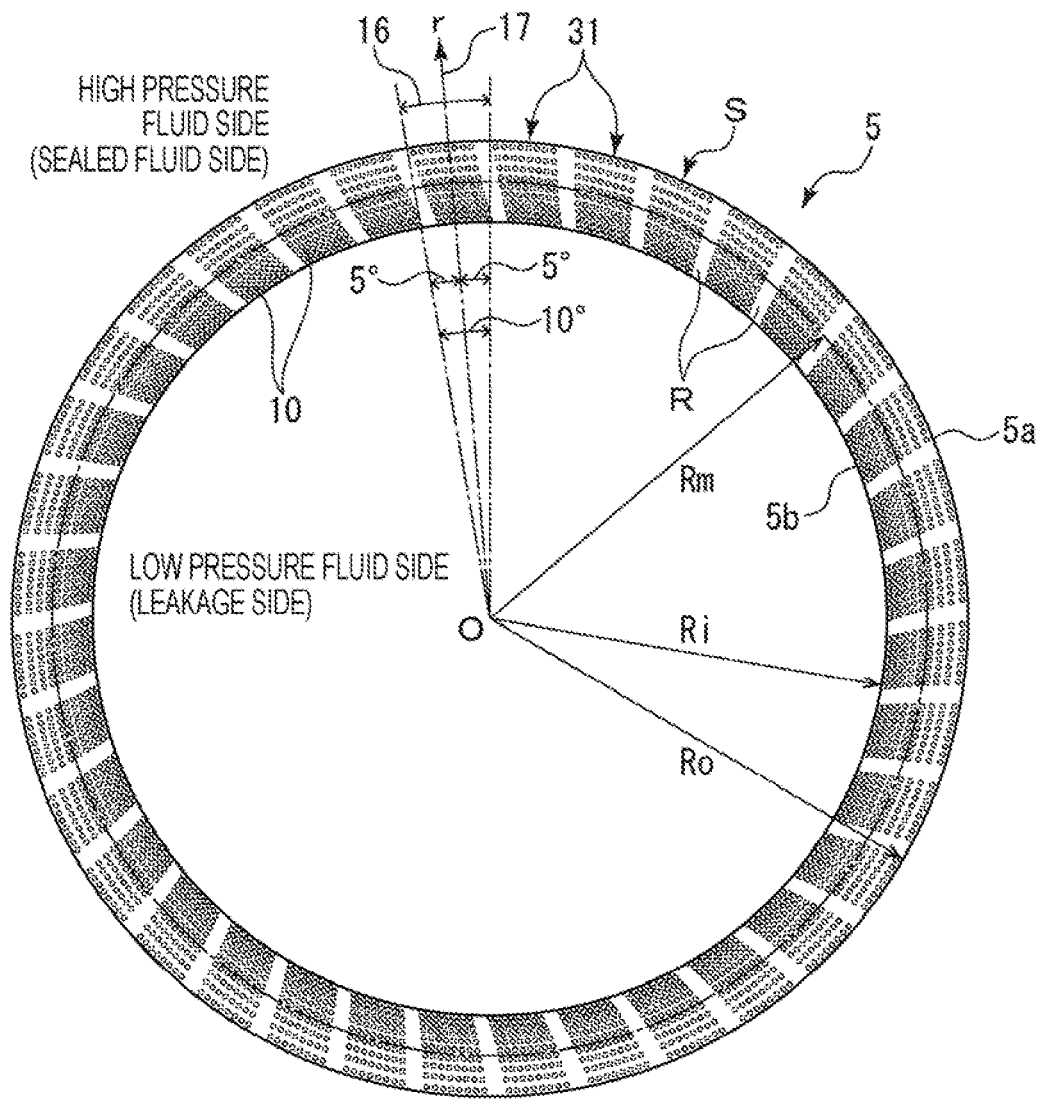
FIG. 6 is a variation of the II-II arrow view of FIG. 1, which is a plan view showing a modified example of the arrangement of the dimples on the sliding face of the sliding part according to the second embodiment of the present invention.

The dimple groups 31 shown in FIG. 6 have the same arrangement as the dimple arrangement of the dimple groups 30 of FIG. 3 but the dimple groups 31 are different in a point that the dimple groups are separated in the circumferential direction by inclined land portions R. Dimples 10 of the dimple group 31 are arranged along the radial axis inclined with respect to the radial axis r to the receding side of the rotation direction of a rotating side seal ring 3. Thereby, the entire dimple group 31 is inclined with respect to the radial axis r. Thus, the pumping effect is exerted by the shape of the entire dimple group 31, and the fluid on the leakage side is efficiently suctioned into the dimple group 31, so that the higher pumping effect is obtained. That is, in addition to a pumping operation obtained by arranging the dimples 10 in such a manner that a relative position of the average radius of the dimples (R mean) in the sliding face in the radial direction is not more than 0.5, by the pumping effect obtained by the shape of the entire dimple group 31, an amount of a fluid suctioned from the leakage side into the sliding face is increased, so that a sealing property of a mechanical seal 1 is improved.

Further, the dimple groups 31 are separated in the circumferential direction via the land portions R. Thus, the fluid flowing in the dimple groups 31 is blocked by the land portions R, a dynamic pressure generation effect is increased in the land portions R, a gap between two sliding faces that slide with respect to each other is increased, and the fluid having the lubricating property flows into the sliding face S. Thus, it is possible to furthermore improve the fluid lubricating operation.

Figure 7:
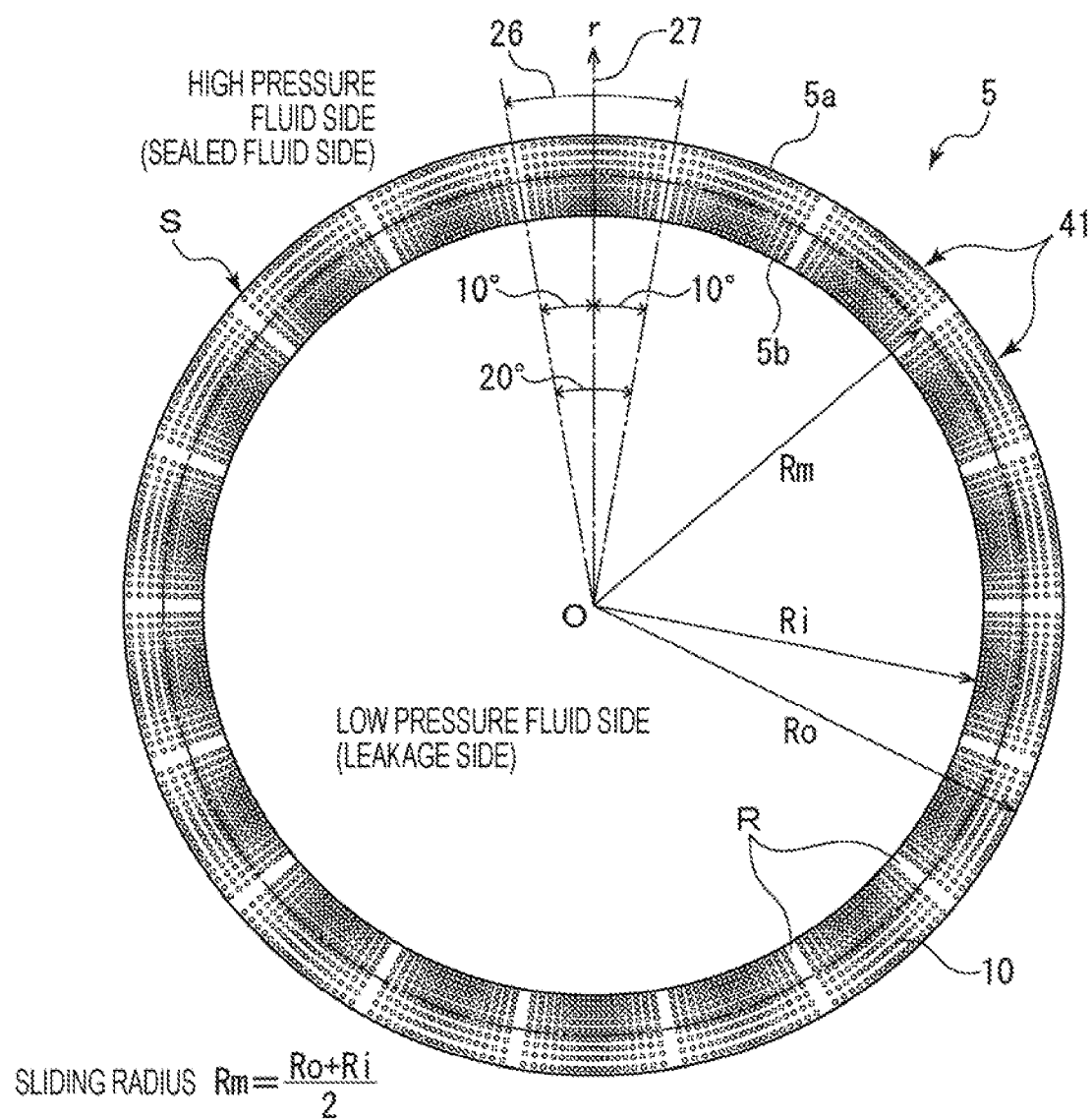
FIG. 7 is a variation of the II-II arrow view of FIG. 1, which is a plan view showing another modified example of the arrangement of the dimples on the sliding face of the sliding part according to the second embodiment of the present invention.

The dimple groups 41 shown in FIG. 7 have the same arrangement as the dimple arrangement of the dimple groups 40 of FIG. 4 but are different from the dimple groups 40 of FIG. 4 in a point that the dimple groups 41 are separated from each other by a predetermined angle (20° in the example of FIG. 7) by land portions R.

Dimples 10 forming the dimple group 41 are arranged in such a manner that an average of radial-direction coordinates is smaller than a sliding radius Rm=(Ri+Ro)/2. Thus, an amount of a fluid suctioned from the leakage side into the sliding face is increased, and the sealing property is improved. Further, by arranging the dimples 10 in such a manner that the dimples are dense in a center portion of the dimple group 41 arranged in a section 26 and more sparse as more away in the circumferential direction from a center portion of the section 26, a part where dimples 10 are arranged densely in the circumferential direction and a part where the dimples are arranged sparsely in the circumferential direction are arranged alternately on the sliding face S. Thereby, an angular-direction standard deviation σe of the dimple group 41 is smaller than one, and the amount of the fluid flowing from the sealed fluid side into the dimple groups 41 is increased, so that it is possible to improve the fluid lubricating performance. Thus, it is possible to prevent generation of large torque (resistance of sliding).

In addition, the dimple groups 41 are separated in the circumferential direction via the land portions R. Thus, the fluid flowing in the dimple group 41 is blocked by the land portions R, and dynamic pressure is generated, so that it is possible to furthermore improve the fluid lubricating operation.

Third Embodiment

Figure 8:
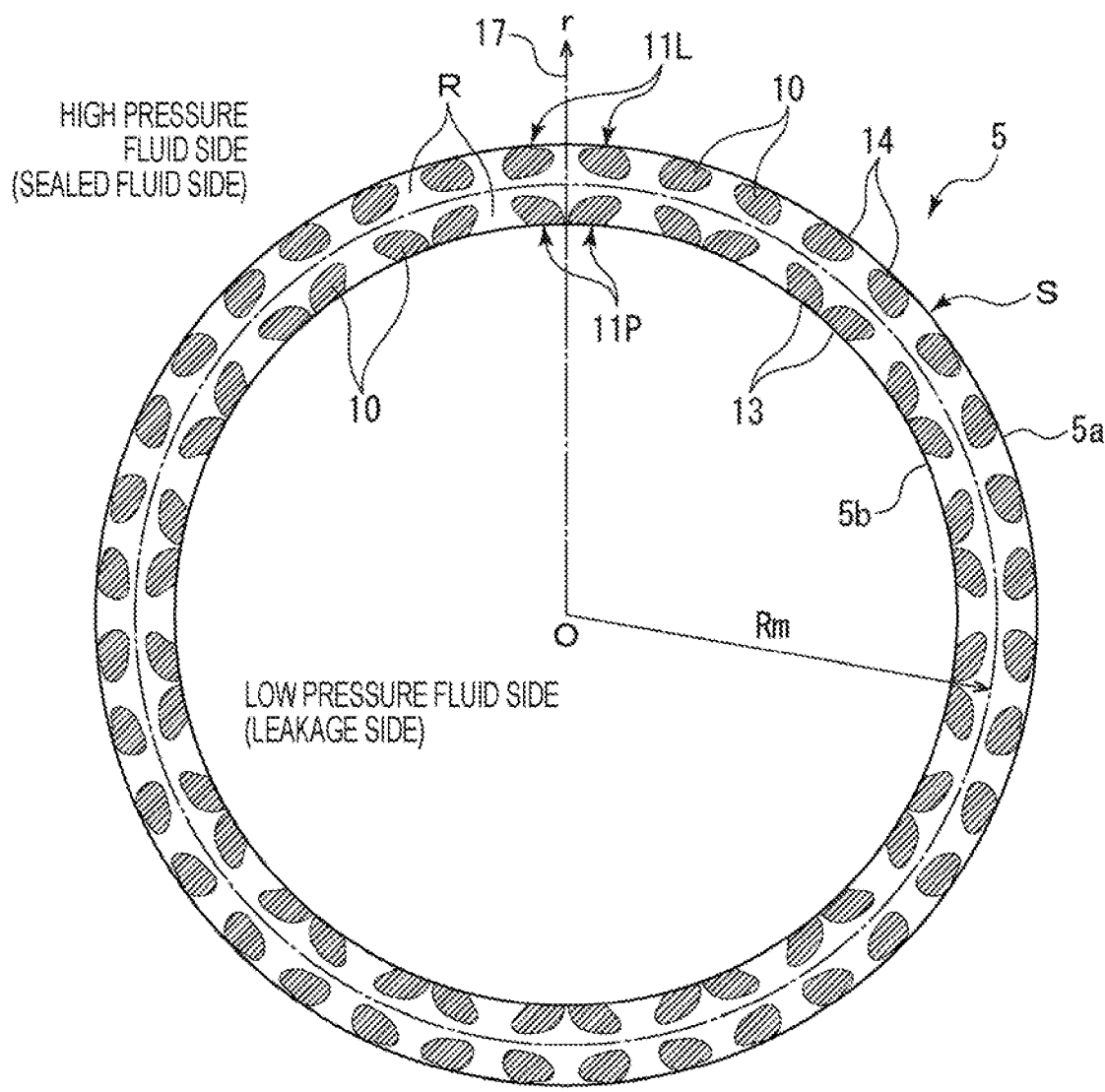
FIG. 8 is a variation of the II-II arrow view of FIG. 1, which is a plan view showing an example of arrangement of dimples on a sliding face of a sliding part according to a third embodiment of the present invention.

With reference to FIG. 8, sliding parts according to a third embodiment of the present invention will be described. The sliding parts according to the third embodiment are different from the sliding parts of the first and second embodiments in a point that in addition to pumping dimple groups, lubricating dimple groups are partitioned from each other and arranged separately. However, the other basic configurations are the same as the first embodiment. The same members will be given the same reference signs and duplicated description will be omitted.

In FIG. 8, thirty-six pumping dimple groups 11P are arranged at equal intervals on the leakage side (inner peripheral side in FIG. 6) of a sliding face S in such a manner that a relative position of the average radius of the dimples (R mean) in the sliding face in the radial direction is not more than 0.5, and thirty-six lubricating dimple groups 11L are arranged at equal intervals on the sealed fluid side (outer peripheral side in FIG. 6) of the sliding face S in such a manner that an angular-direction standard deviation $\sigma_\theta$ is less than one.

Although the dimple groups 21, 31, 41 are formed in a substantially rectangular shape, the pumping dimple groups 11P and the lubricating dimple groups 11L are formed in an island shape surrounded by the sliding face S. Dimple arrangement of the island-shaped pumping dimple groups 11P and the island-shaped lubricating dimple groups 11L has the same arrangement as the dimple arrangement of the dimple groups 21, 31, 41. The pumping dimple group 11P has an opening portion 13 on a leakage side peripheral surface 5b of a stationary side seal ring 5 and communicates with only the leakage side. Thereby, a fluid on the leakage side is suctioned from the opening portion 13 into the pumping dimple group 11P, so that it is possible to improve the sealing performance. Moreover, the pumping dimple group 11P is formed in such a manner that the relative position of the average radius of the dimples (R mean) is not more than 0.5. Thus, an amount of a fluid suctioned from the inner peripheral side of the sliding face S (leakage side) into the sliding face is furthermore increased, so that the sealing property is further improved.

The lubricating dimple group 11L is formed in an island shape surrounded by the sliding face S, has an opening portion 14 on a sealed fluid side peripheral surface 5a of the stationary side seal ring 5, and communicates with only the sealed fluid side. Thereby, the amount of the sealed fluid flowing from the opening portion 14 into the lubricating dimple group 11L is increased, so that it is possible to improve the fluid lubricating performance. Moreover, the lubricating dimple group 11L is formed in such a manner that the angular-direction standard deviation σe is less than one. Thus, generation of large torque (resistance of sliding) is furthermore prevented.

In the present embodiment, the pumping dimple groups 11P having a large suction amount to the sliding face S are arranged on the leakage side of the sliding face S and the lubricating dimple groups 11L with which a characteristic of letting the fluid flow into the sliding face S is improved and thickness of a liquid film is increased are arranged on the sealed fluid side. Thereby, it is possible to improve both the sealing performance and the lubricating performance.

Regarding the pumping dimple groups 11P and the lubricating dimple groups 11L, the two adjacent dimple groups 11P and the two adjacent dimple groups 11L are respectively formed symmetrically with respect to the center axis 17 passing through rotation center. Therefore, even when the opposing sliding face is rotated in any directions, similar functions can be exerted. Thus, it is regarded as a suitable shape for sliding parts in which both sliding faces are rotated. The pumping dimple groups 11P and the lubricating dimple groups 11L are not limited to thirty-six and equal intervals but the number is only required to be more than one and the dimple groups do not have to be arranged at equal intervals.

According to the above description, the sliding parts according to the third embodiment of the present invention exert the following specifically remarkable effects.

The pumping dimple groups 11P in which the relative position of the average radius of the dimples (R mean) is not more than 0.5 are arranged on the leakage side of the sliding face S, and the lubricating dimple groups 11L in which the angular-direction standard deviation $\sigma_\theta$ is less than one are arranged on the sealed fluid side of the sliding face S. Thereby, it is possible to improve the sealing property of the sliding face S and also furthermore improve the lubricating property.

The two adjacent dimple groups 11P and the two adjacent dimple groups 11L are respectively formed symmetrically with respect to the center axis 17 passing through the rotation center. Thereby, it is possible to provide the sliding parts favorable for sliding parts in which both sliding faces are rotated.

Fourth Embodiment

Figure 9:
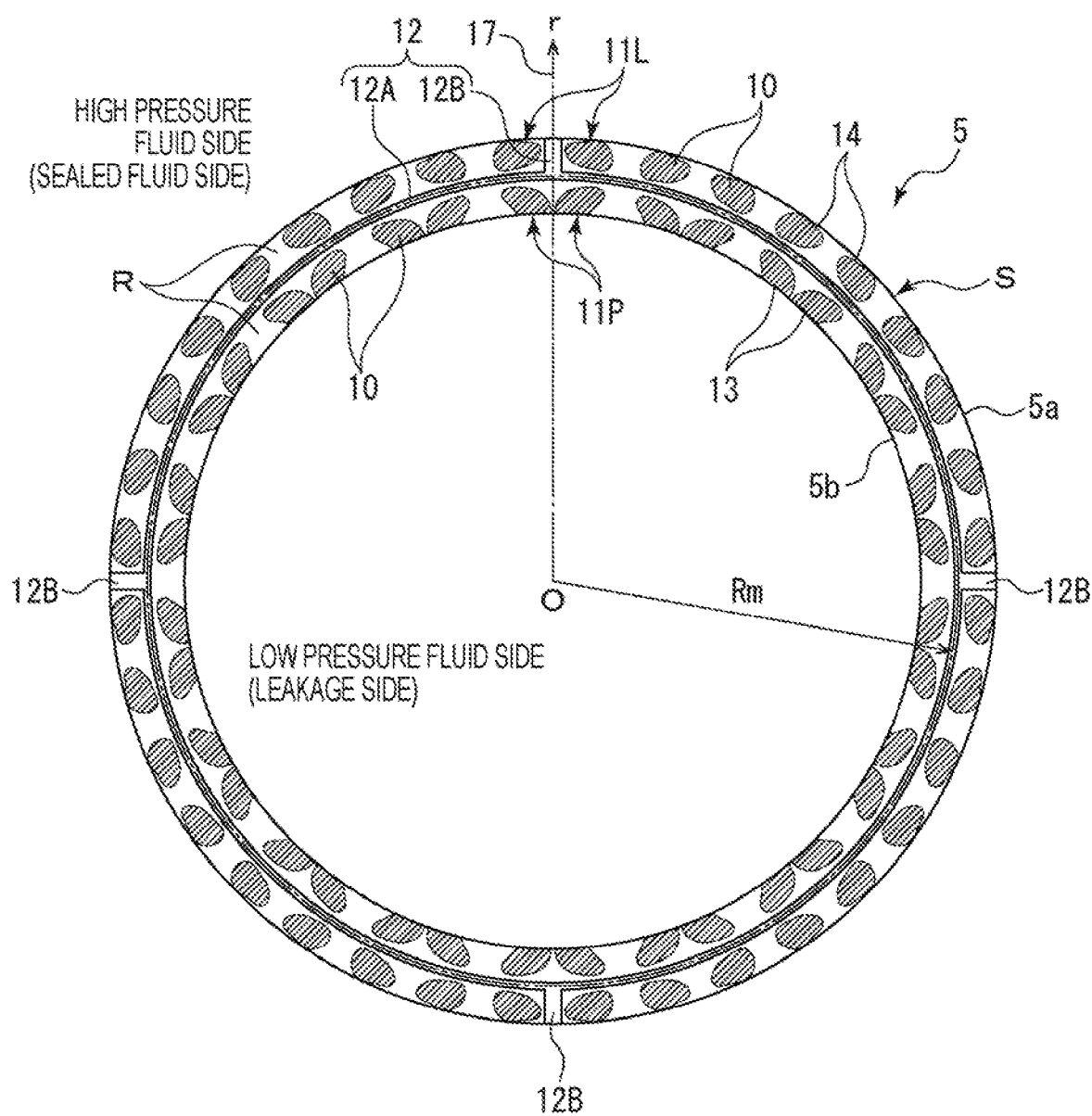
FIG. 9 is a variation of the II-II arrow view of FIG. 1, which is a plan view showing an example of arrangement of dimples on a sliding face of a sliding part according to a fourth embodiment of the present invention.

With reference to FIG. 9, sliding parts according to a fourth embodiment of the present invention will be described. The sliding parts according to the fourth embodiment are different from the sliding parts of the third embodiment in a point that a deep groove 12 is provided. However, the other basic configurations are the same as the third embodiment. The same members will be given the same reference signs and duplicated description will be omitted.

In FIG. 9, thirty-six pumping dimple groups 11P are arranged at equal intervals on the leakage side of a sliding face S, lubricating dimple groups 11L are arranged on the sealed fluid side of the sliding face S, and the deep groove 12 is arranged between the pumping dimple groups 11P and the lubricating dimple groups 11L.

The deep groove 12 is formed by a circumferential deep groove 12A (annular groove according to the present invention) and radial deep grooves 12B (communication groove according to the present invention), and isolated from the leakage side. The circumferential deep groove 12A is provided over the entire circumference of the sliding face S, and communicates with the sealed fluid side via the radial deep grooves 12B.

The deep groove 12 has a function of supplying a fluid to the sliding face S from the sealed fluid side to lubricate the sliding face S, and also a function of blocking between a pumping region where the pumping dimple groups 11P are arranged and a liquid film holding region where the lubricating dimple groups 11L are arranged to exert effects of both the regions without destructing.

According to the above description, the sliding parts according to the fourth embodiment of the present invention exert the following specifically remarkable effects.
(1) The deep groove 12 being isolated from the leakage side and communicating with the sealed fluid side is arranged on the sliding face S, and the circumferential deep groove 12A of the deep groove 12 is arranged between the pumping dimple groups 11P and the lubricating dimple groups 11L. Thereby, the fluid is supplied from the sealed fluid side to the sliding face S and it is possible to improve the lubricating property of the sliding face S. It is also possible to prevent contact between the pumping dimple groups 11P and the lubricating dimple groups 11L. Thus, it is possible to sufficiently exert the functions of the pumping dimple groups 11P and the functions of the lubricating dimple groups 11L.
(2) Roles of the pumping dimple groups 11P and the lubricating dimple groups 11L are separated from each other. Thus, it is possible to make design of the sliding parts easier.

The modes in which the present invention is implemented are described with the embodiments above. Specific configurations are not limited to the modes of these embodiments but the present invention also includes changes and additions within the range not departing from the gist of the present invention.

For example, in the above embodiments, the example in which the sliding part is used for at least any one of the pair of the rotating side seal ring and the stationary side seal ring in the mechanical seal device is described. However, the sliding part can also be utilized as a sliding part of a bearing to slide with a rotating shaft while sealing lubricating oil on the axially one side of a cylindrical sliding face.

In the above embodiments, the outer peripheral side of the sliding part is described as the high pressure fluid side (sealed fluid side), and the inner peripheral side as the low pressure fluid side (leakage side). However, the present invention is not limited to this but is also applicable to a case where the outer peripheral side of the sliding part is the low pressure fluid side (leakage side) and the inner peripheral side is the high pressure fluid side (sealed fluid side).

REFERENCE SIGNS LIST 1 mechanical seal
2 sleeve
3 rotating side seal ring
4 housing
5 stationary side seal ring
6 coiled wave spring
7 bellows
10 dimple
11 dimple group
11P pumping dimple group
11L lubricating dimple group
12 deep groove
12A circumferential deep groove (annular groove)
12B radial deep groove (communication groove)
16 section
17 center position of section
20 dimple group
20$a$ sub dimple group
20$b$ sub dimple group
20$c$ sub dimple group
21 dimple group
26 section
27 center position of section
30 dimple group
30$a$ sub dimple group
30$b$ sub dimple group
30$c$ sub dimple group
31 dimple group
40 dimple group
40$a$ sub dimple group
40$b$ sub dimple group
40$c$ sub dimple group
41 dimple group
S sliding face
R land portion
Rm sliding radius
r radial axis
R mean relative position of the average radius of the dimples
$\sigma_\theta$ angular-direction standard deviation

The invention claimed is:

1. A pair of sliding parts having sliding faces that slide with respect to each other around a sliding axis in which at least the sliding face on one side includes a dimple group formed by arranging plural dimples, characterized in that the dimples are arranged such that an average of radiuses of the dimples measured at center coordinates of the dimples of the dimple group with reference to the sliding axis, is smaller than a sliding radius of the sliding face, which is an average of an inner radius of the sliding face and an outer radius of the sliding face, and such that an angular-direction standard deviation of the center coordinates of the dimples of the dimple group is less than one.

2. The sliding parts according to claim 1, characterized in that plural dimple groups are formed independently from each other in the circumferential direction of the sliding face via a land portion.

3. The sliding parts according to claim 2, characterized in that the dimples are arranged such that an angular-direction standard deviation of the center coordinates of the dimples of the dimple group is less than 0.8.

4. The sliding parts according to claim 2, characterized in that the dimple group is constituted by an aligned dimple group formed by arranging and aligning the plural dimples in a circumferential direction and in a radial direction.

5. The sliding parts according to claim 1, characterized in that the dimples are arranged such that an angular-direction standard deviation of the center coordinates of the dimples of the dimple group is less than 0.8.

6. The sliding parts according to claim 5, characterized in that a pumping dimple group formed by arranging the dimples such that the average of the radiuses of the dimples measured at the center coordinates of the dimples of the dimple group with reference to the sliding axis is smaller than the sliding radius of the sliding face is arranged on the leakage side of the sliding face, and a lubricating dimple group formed by arranging the dimples such that the angular-direction standard deviation of the center coordinates of the dimples of the dimple group is at least less than one is arranged on the sealed fluid side of the sliding face.

7. The sliding parts according to claim 5, characterized in that the dimple group is constituted by an aligned dimple group formed by arranging and aligning the plural dimples in a circumferential direction and in a radial direction.

8. The sliding parts according to claim 1, characterized in that a pumping dimple group formed by arranging the dimples such that the average of the radiuses of the dimples measured at the center coordinates of the dimples of the dimple group with reference to the sliding axis is smaller than the sliding radius of the sliding face is arranged on the leakage side of the sliding face, and a lubricating dimple group formed by arranging the dimples such that the angular-direction standard deviation of the center coordinates of the dimples of the dimple group is at least less than one is arranged on the sealed fluid side of the sliding face.

9. The sliding parts according to claim 8, characterized in that the sliding face further includes an annular groove arranged between the pumping dimple group and the lubricating dimple group, and a communication groove providing communication between the annular groove and the sealed fluid side.

10. The sliding parts according to claim 9, characterized in that the dimple group is constituted by an aligned dimple group formed by arranging and aligning the plural dimples in a circumferential direction and in a radial direction.

11. The sliding parts according to claim 8, characterized in that the dimple group is constituted by an aligned dimple group formed by arranging and aligning the plural dimples in a circumferential direction and in a radial direction.

12. The sliding parts according to claim 1, characterized in that the dimple group is constituted by an aligned dimple group formed by arranging and aligning the plural dimples in a circumferential direction and in a radial direction.

13. The sliding parts according to claim 12, characterized in that the aligned dimple group is formed by arranging plural sub dimple groups in a concentric manner, the sub dimple groups being respectively formed by arranging the plural dimples in forms of rings.

14. The sliding parts according to claim 13, characterized in that the sub dimple groups are arranged such that a radial gap between the sub dimple groups arranged in a concentric manner is gradually increased toward the radially outside.

15. The sliding parts according to claim 13, characterized in that the plural dimples forming the aligned dimple group are arranged along the axis inclined with respect to the radial axis.

16. The sliding parts according to claim 1, characterized in that the plural dimples forming the aligned dimple group are arranged along the axis inclined with respect to the radial axis.

17. The sliding parts according to claim 1, characterized in that on the sliding face, a part where the dimples are arranged densely in the circumferential direction and a part where the dimples are arranged sparsely in the circumferential direction are arranged alternately.

18. The sliding parts according to claim 1, wherein the average of the radiuses of the dimples (Rd) measured at the center coordinates of the dimples satisfies the following relationship:

$$(Rd-Ri)/(Ro-Ri)<0.5$$

wherein Ri denotes an inner radius of the sliding face, and Ro denotes an outer radius of the sliding face.

* * * * *